United States Patent [19]

Rowan et al.

[11] 3,708,197
[45] Jan. 2, 1973

[54] TRUCK HOIST CRADLE

[76] Inventors: Donald James Rowan; Kenneth Lorne Rowan, both of P.O. Box 91; Larry James Rowan, P.O. Box 54, all of Elkhorn Manitoba, Canada

[22] Filed: Aug. 16, 1971

[21] Appl. No.: 172,155

[52] U.S. Cl..............................294/67 E, 294/82 AH
[51] Int. Cl..................................B66c 1/12
[58] Field of Search.......................294/67 E, 82 AH

[56] References Cited

UNITED STATES PATENTS 2,818,296  12/1957  Brennan et al......................294/67 E
2,593,664  4/1952  Fearfield et al.....................294/67 E

*Primary Examiner*—Evon C. Blunk
*Assistant Examiner*—Douglas C. Bellis
*Attorney*—C. C. Kent et al.

[57] ABSTRACT

A pair of end members are hinged to wheel well and plates and hinged ramps extend across the ends of the wheel well members. Chains or cables extend between said members and the ramps to raise the end members vertically and the ramps upwardly at an angle to the floor when the hoist is raised. The chains permit the end members and the ramp to lie flat on the floor when the hoist is in the lowermost position.

10 Claims, 10 Drawing Figures

INVENTOR
DONALD JAMES ROWAN,
KENNETH LORNE ROWAN &
LARRY JAMES ROWAN

BY

ATTORNEY

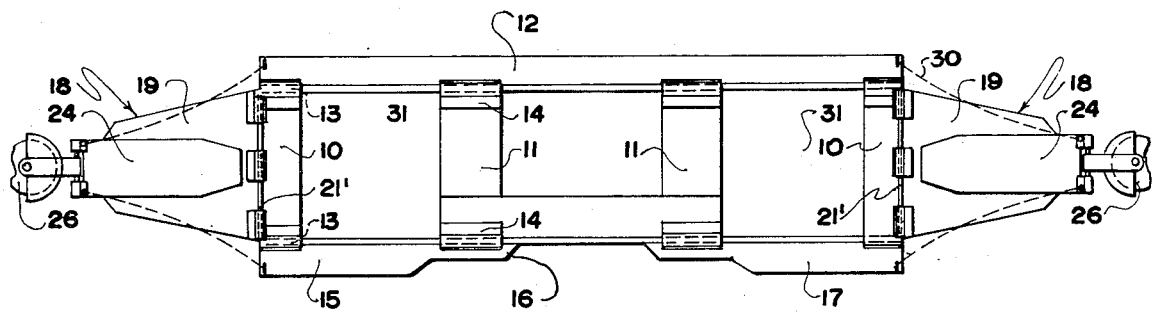
FIG. 5
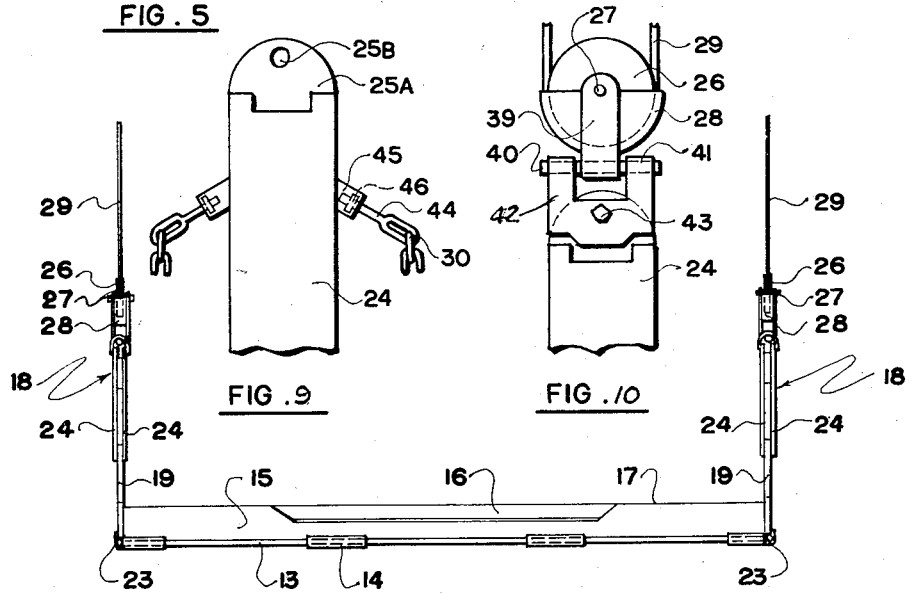
FIG. 9   FIG. 10
FIG. 6
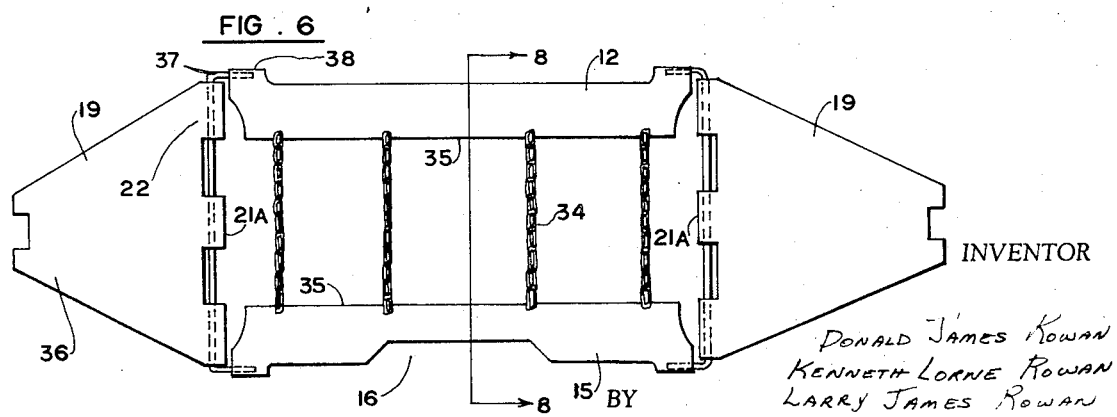
FIG. 7

TRUCK HOIST CRADLE

This invention relates to new and useful improvements in truck hoist cradles, particularly truck hoist cradles used at grain elevators whereupon it is conventional for a truck to drive onto a cradle by the front wheels thereof and the cradle is hoisted upwardly thus allowing the truck to dump the grain or other contents rapidly and easily.

Conventional hoist cradles suffer from several disadvantages, the principal one of which is the fact that often the truck rolls from the cradle during the hoisting operation with considerable damage ensuing both to the truck and to the cradle.

Another disadvantage of conventional hoist cradles is the fact that the point of hoist is often below axle of the wheels so that the center of roll is above the hoist attachment thus causing, under some conditions, the cable to swing under and away from the wheels as the joisting operation takes place once again permitting the truck to become disengaged from the hoist.

A further disadvantage of conventional hoist cradles is the slowness of which they may be readied for receiving the truck and the slowness with which they lower the ramps to permit the truck to drive away. It should be understood that in busy seasons, quick turn around is essential not only to the elevator operator but also to the trucker who may have many trips to make with loads of grain, feed and the like.

The present invention overcomes all of these disadvantages by providing a truck hoist which rapidly raises the ramps and lowers same, which has a point of hoist above the rolling center of the axle, and which is extremely safe in use due to the relationship between the various parts.

The principal object and essence of the invention is therefore to provide a truck hoist cradle of the character herewithin described in which the ramps are raised prior to the lifting operation being initiated and which furthermore permits the ramps to be lowered as soon as the hoist engages the supporting surface or ground during the downward movement.

A further object of the invention is to provide a device of the character herewithin described in which the lifting load is taken by end components rather than by linkage which raises and lowers the ramps.

Still another object of the invention is to provide a device of the character herewithin described in which the lifting load is taken by end components rather than by linkage which raises and lowers the ramps.

Still another object of the invention is to provide a device of the character herewithin described in which the point of hoist is above the rolling center of the axle.

Another object of the invention is to provide a device of the character herewithin described which is simple in construction, economical in manufacture, and otherwise well suited to the purpose for which it is designed.

With the foregoing in view, and such other or further purposes, advantages or novel features as may become apparent from consideration of this disclosure and specification, the present invention consists of, and is hereby claimed to reside in, the inventive concept which is comprised, embodied, embraced, or included in the method, process, construction, composition, arrangement or combination of parts, or new use of any of the foregoing, of which concept, one or more specific embodiments of same are herein exemplified as illustrative only of such concept, reference being had to the accompanying Figures in which:

FIG. 5 is a top plan view of the cradle in the lowermost position.

FIG. 6 is a front elevation of the cradle in the hoisting position.

FIG. 7 is a top plan view of the cradle showing an alternative embodiment.

FIG. 9 is a fragmentary front elevation of the preferred embodiment of the upper part of the hoist plates.

FIG. 10 is a view similar to FIG. 9 but with the pulley adaption component secured thereto.

In the drawings like characters of reference indicate corresponding parts in the different figures.

Figure 1:
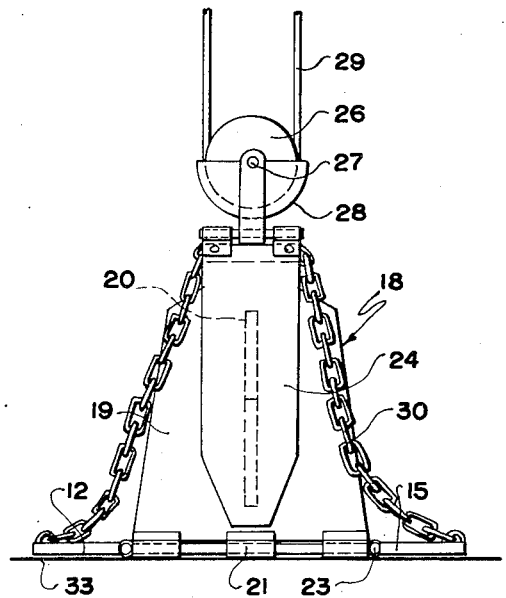
FIG. 1 is an end view of the cradle in the ground engaging position.

Proceeding therefore to describe the invention in detail, I have provided a plurality of cross members 10 and 11 situated in spaced and parallel relationship, the members 10 being classified as the outermost members, and the members 11, the inner members.

A front ramp 12 extends across the front ends of the cross members 10 and 11 and is hingedly secured thereto by means of hinge pins 13 passing through hinge components 14.

A rear ramp 15 extends a cross the rear ends of the cross members 10 and 11 and is hingedly secured thereto in a similar manner, by means of hinge pins 13 and hinge members 14.

A cutout portion 16 is formed within the rearmost edge 16 of the ramp 15 so that when it is in the raised position, it clears the exhaust pipe of the truck engaged within the hoist.

Figure 4:
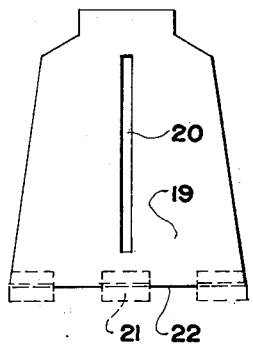
FIG. 4 is a front elevation of one of the main attaching plates.

End components collectively designated 18 are provided and take the form of a substantially truncated triangular main attaching plate 19 having a vertical slot 20 formed therethrough and centrally located as clearly shown in FIG. 4. Hinge components 21 are provided upon the lower edge 22 of the plate 19 and corresponding components 21' are provided upon the outer edges of the outermost cross members 10.

Hinge pins 23 connect the main attaching plates to the outermost cross members 10 in hinging relationship.

Figure 3:
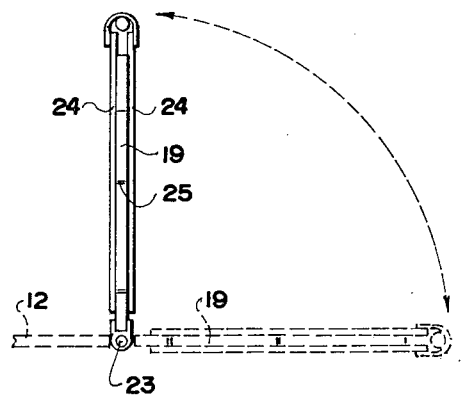
FIG. 3 is a side elevation of one of the nd components.

A pair of hoist plates 24 are situated in spaced and parallel relationship and are joined together by means of a bar or strip 25 welded to the inner surfaces of the two plates 24 as clearly shown in FIG. 3.

It should be appreciated that the bar or means 25 engages slot 20 so that the two plates have to be assembled in conjunction with the main attaching plate 19 and then welded into position thus permitting the hoist plates to move vertically due to the engagement of the bar 25, within the limits of slot 20 and it is desired that the slot 20 be approximately twice as long as the bar or means 25.

A pulley assembly taking the form of a V-pulley 26 is journalled upon pin 27 within a carrier 28 which in turn is hinged to the upper ends of the hoist plates 24 and cable 29 extends to a conventional hoist situated above the cradle, said hoist not being illustrated.

Figure 2:
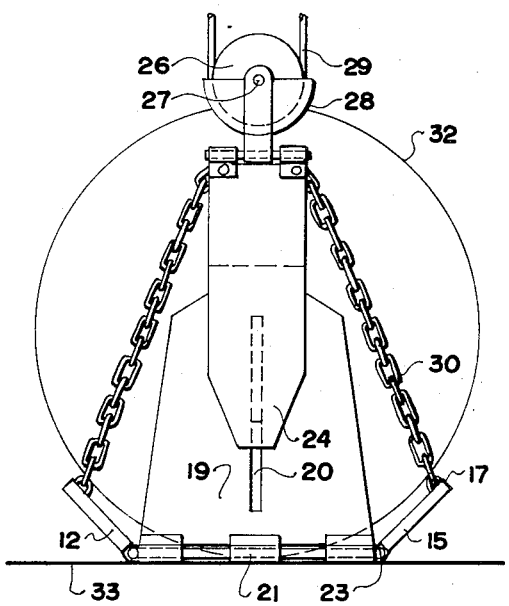
FIG. 2 is an end view of the cradle in the hoisting position.

Linkage taking the form of chains 30 or flexible cables, extends between the ends of the ramps 12 and 15 and the upper end of the hoist plates 24 as shown in FIGS. 1, 2 and 5.

In operation, and assuming the cradle is in the position shown in FIG. 5, it will be noted that the ramps 12 are flat upon the ground or supporting surface and the end components 18 have also folded outwardly to lie flat upon the supporting surface. This permits unrestricted access to the cradle by the truck being unloaded which drives upon the cradle so that the front wheels engage the wheel well areas 31 defined by the pairs of cross members 10 and 11 and the portions of the front and rear ramps 12 and 15 extending across the ends of these cross members.

Reference character 32 shows in phantom the outline of a wheel of a truck in position and it will be observed that the center of this wheel which coincides with the axle thereof is well below the hoisting or lifting axis which is defined by the pin 27 upon which pulley 26 is mounted.

The hoist is then operated to raise the cradle and the initial action lifts or raises the hoist plates 24 upwardly with respect to the main plate 19 until the upper end of the rod 25 engages the upper end of slot 20. In this position, the chains 30 have been raised also thus lifting the ramps upwardly at an angle around their hinge pins, to a position shown in FIG. 2 whereupon they engage the tires of the vehicle upon the cradle.

Further lifting raises the entire cradle together with the front of the truck thereon and it should be observed that this load is carried not by the chains 30 but by the engagement of the rod or bar 25 within the upper end of slots 20.

After the truck has been unloaded in the usual way, the hoist is lowered and as soon as the cradle engages the supporting surface or ground represented by reference character 33, the hoist plates move downwardly with relation to slots 20 thus permitting the ramps to flatten and lie upon the ground or supporting surface. This permits the truck to be driven from the ramp immediately and further lowering of the hoist will permit the end components 18 to move outwardly to take up the flat position shown in FIG. 5 so that the cradle is ready for the next truck to be driven thereon.

Figure 8:
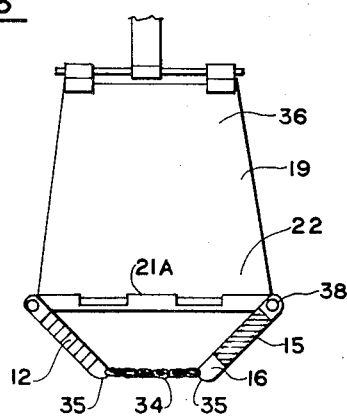
FIG. 8 is an end view of FIG. 7.

FIGS. 7 and 8 show an alternative embodiment of the construction in which the principal is similar.

Front ramp 12 and rear ramp 15 are connected together by lengths of chain 34 extending between the inner edges 35 of the ramps in spaced and parallel relationship as clearly shown in FIG. 7.

The main attaching plates 19 are similar in configuration to those hereinbefore described but the hoist plates are eliminated. The pulley 26 is attached to the upper ends 36 of these main attaching plates in a similar manner although this has not been illustrated in FIGS. 7 and 8.

End hinge pins 37 engage the hinge portions 21A of the main attaching plates adjacent the lower edges 22 thereof and these hinge pins are angulated at the ends thereof to engage hinge portions 38 formed on the outer corners of the ramps 12 and 15 as clearly shown.

It will therefore be appreciated that the main attaching plates 19 may lie flat upon the ground as shown in FIG. 7 when in the lowermost position yet may be moved to the vertical position by means of the conventional hoist as hereinbefore described. As the cradle is lifted from the ground, the weight of the ramps 12 and 15 cause the inner edges 35 to move downwardly until restrained by chains 34 and as shown in FIG. 8. The wheels of the truck will rest between adjacent pairs of lengths of chain 34 so that the cradle effect is maintained, it being understood, of course, that the point of hoist is above the axle of the front wheels.

FIGS. 9 and 10 show the preferred construction of the hoist plates 24 in which the bar or strut 25 is extended above the plates 24 in the form of an apertured extension 25A. The overhead hoist (not illustrated) may be engaged directly in aperture 25B or alternatively, the pulley assembly may be attached to this extension.

The carrier 28 includes a pair of attaching straps 39 secured to cross pin 40 which in turn engages bearing sleeve 41 formed on the upper side of an adaptor component 42.

This adaptor component is in turn bolted to extension 25A by means of nut and bolt assembly 43 passing through aperture 25B.

The chains 30 are secured by bolts 44 engaging through apertured collars 45 welded to each side of plates 24. A nut 46 engages the bolt within the collar thus permitting limited length adjustment of the chain. This adjustment is desirable to suit conditions and to enable the operator to adjust the inclination of the ramps as he may wish, within limits.

What is claimed to be the present invention is:

1. A truck hoist cradle comprising in combination a pair of transversely extending ramps, a plurality of spaced apart cross members, said ramps being hingedly secured to the ends of said cross members, said ramps and said cross members defining a pair of wheel receiving wells, end components secured to the outermost of said cross members, and linkage means extending between said ramps and said end components and cooperating to raise said ramps when said cradle is hoisted and to lower said ramps when said cradle is in the lowermost position upon a supporting surface.

2. The cradle according to claim 1 in which the connection between said end components and said outermost cross members is hinged whereby said end components also lie flat when said hoist cradle is in the lowermost position upon a supporting surface.

3. The hoist cradle according to claim 1 in which said end components comprise a main attaching plate, and a hoist plate slideable within limits, with respect to said main attaching plate, whereby said ramps are raised by said linkage prior to said cradle being hoisted and/or lowered by said linkage as soon as said cradle engages the supporting surface.

4. The hoist cradle according to claim 2 in which said end components comprise a main attaching plate, and a hoist plate slideable within limits, with respect to said main attaching plate, whereby said ramps are raised by said linkage prior to said cradle being hoisted and/or lowered by said linkage as soon as said cradle engages the supporting surfaces.

5. The hoist cradle according to claim 1 in which said end components include a main attaching plate, a vertical slot formed therein, a pair of hoist plates one upon each side of said main plate, and means extending between said hoist plates and engageable within said slot, said slot being approximately twice as long as said means.

6. The hoist cradle according to claim 2 in which said end components include a main attaching plate, a vertical slot formed therein, a pair of hoist plates one upon each side of said main plate, and means extending between said hoist plates and engageable within said slot, said slot being approximately twice as long as said means.

7. The hoist cradle according to claim 1 in which said linkage comprises a length of flexible material, and a pulley assembly detachably securable to said hoist plates at the upper ends thereof and means to detachably secure said pulley assembly to said hoist plates in pivotal relationship thereto.

8. The hoist cradle according to claim 2 in which said linkage comprises a length of flexible material, and a pulley assembly detachably securable to said hoist plates at the upper ends thereof and means to detachably secure said pulley assembly to said hoist plates in pivotal relationship thereto.

9. The hoist cradle according to claim 3 in which said linkage comprises a length of flexible material, and a pulley assembly detachably securable to said hoist plates at the upper ends thereof and means to detachably secure said pulley assembly to said hoist plates in pivotal relationship thereto.

10. The hoist cradle according to claim 4 in which said linkage comprises a length of flexible material, and a pulley assembly detachably securable to said hoist plates at the upper ends thereof and means to detachably secure said pulley assembly to said hoist plates in pivotal relationship thereto.

* * * * *